Patented Aug. 25, 1953

2,650,242

UNITED STATES PATENT OFFICE 2,650,242

SEPARATION OF TYROSINE AND CYSTINE

Earl V. Cardinal, Berwyn, Ill., assignor to Corn Products Refining Company, New York, N. Y., a corporation of New Jersey No Drawing. Application August 28, 1951, Serial No. 244,089

9 Claims. (Cl. 260—519)

This invention relates to a process for the separation and recovery of tyrosine and cystine from mixtures containing these two amino acids. It is particularly applicable to mixtures rich in tyrosine and cystine.

An object of the invention is to provide a new and economical process for the separation of tyrosine and cystine from crude mixtures of these amino acids. A further object is to provide a method for the purification of tyrosine or cystine which may be contaminated one with the other. A further object is to provide a method for the separation and purification of tyrosine and cystine from neutralized hydrolysates of proteins. Still a further object is to provide a method for separating tyrosine and cystine which is simple and economical and avoids long procedures of purification. Other objects will appear hereinafter.

All proteins appear to contain both tyrosine and cystine and these amino acids commonly fall together during recovery of amino acids from protein hydrolysates because of the similar solubility characteristics of tyrosine and cystine. Their solubilities in water, alkali, and in acid solutions are almost identical, and hence their separation is very difficult. In order to obtain either pure cystine or pure tyrosine, it has been necessary in the past to choose protein sources such that one of these amino acids is present in only minor proportions.

In the past, hydrochloric acid-hydrolysates of proteins containing both cystine and tyrosine have been partially neutralized, treated with cuprous oxide to form the cuprous salt of cystine and filtered to remove the latter compound. The filtrate was then freed of copper by using hydrogen sulfide and thereafter tyrosine was recovered. Another method for separating tyrosine and cystine depends upon treatment of a tyrosine-cystine mixture with alcohol and anhydrous hydrogen chloride under esterification conditions. Tyrosine, which is more readily esterified, passes into solution and may thereupon be separated from the cystine. Cystine has also been precipitated preferentially from mixtures containing cystine and tyrosine as the phosphotungstate or as the mercury salt. None of these methods has been entirely satisfactory for the reason that neither cystine nor tyrosine is obtained in pure form.

I have discovered that tyrosine and cystine may be separated from each other by a relatively simple and inexpensive process and with a high degree of efficiency. My novel process consists in treating an aqueous suspension of a mixture containing tyrosine and cystine with an alkaline reducing agent, such as sodium sulfide, which converts the cystine to the much more soluble cysteine, and then taking advantage of a limited pH range in which tyrosine is insoluble and cysteine is soluble to permit separation of the tyrosine. Although the alkali sulfide may dissolve some of the tyrosine, at the same time it reduces the cystine to the much more soluble cysteine. After the cystine has been reduced and has gone into solution as cysteine, the pH of the mixture is lowered to a range where any tyrosine which has been partially dissolved will precipitate, while the cysteine remains in solution. The tyrosine then is removed, as by filtration, and the cysteine in the filtrate is reoxidized to cystine. The pH of the solution then is adjusted to a range wherein cystine is precipitated and recovered as such.

The first step in the process of the invention is the dissolution of part or all of the cystine in an alkaline medium. The second step is rapid reduction of the dissolved cystine to cysteine. Any alkaline medium may be employed to dissolve the cystine but an alkali metal sulfide is preferred since it also serves as the reducing agent to convert the cystine to cysteine. Sufficient alkali metal sulfide or a mixture of alkali and alkali metal sulfide should be employed to provide at least 2 moles of alkali metal sulfide for each mole of cystine and to maintain an adequately alkaline pH level. Under these conditions all the cystine goes into solution and is reduced to cysteine. The pH of the mixture then is lowered to a point where any dissolved tyrosine precipitates, but cysteine remains in solution. The tyrosine is separated as by filtration and the cysteine is oxidized to cystine by acidifying the filtrate and boiling until hydrogen sulfide is removed.

The reduction proceeds rapidly at room temperature and oxidation of cysteine to a large extent follows at once upon removal of hydrogen sulfide.

In carrying out the invention, a mixture containing tyrosine and cystine is suspended in an aqueous solution of an alkali metal sulfide, such as sodium sulfide. The pH of the suspension should preferably be 10 but may be within the range of 9 to 11. The mixture is allowed to stand at about 25° C. for about 15 to 45 minutes to effect reduction of the cystine to cysteine. Higher temperatures may be used provided the cysteine is not destroyed although there is no particular advantage. Thereafter, the pH is adjusted to a point within the range of 7 to 9, preferably to 7.5, at which the tyrosine alone precipitates. The tyrosine is removed as by filtration. It may be purified by treatment with decolorizing carbon. The filtrate containing the cysteine is acidified preferably to a pH of about 1.6 to 2.0 although the range may be 0.5 to 5.0 and boiled until hydrogen sulfide is removed. Longer heating times do not adversely affect the results although they are of no particular advantage. The purpose of the foregoing treatment is to remove the hydrogen sulfide formed and simultaneously oxidize the cysteine to cystine. After hydrogen sulfide is removed, the pH of the solution is adjusted to about 2 to 6 to precipitate the cystine. The cystine may then be removed as by filtration and purified by treatment with decolorizing carbon.

The process is particularly applicable to crude mixtures of tyrosine and cystine obtained by the hydrolysis of wheat gluten. One such mixture which was treated with good results contained about 76 per cent of tyrosine, 18 per cent cystine and small amounts of other amino acids and other impurities. The process is also applicable to any mixture of amino acids containing relatively substantial amounts of cystine and tyrosine.

The preferred reducing agents are the alkali metal sulfides, sodium and potassium sulfide although other alkaline reducing agents such as ammonium sulfide may also be used for the separation of tyrosine and cystine within the pH range where tyrosine is insoluble and cysteine is soluble.

The acid which is preferable for acidifying the filtrate containing the cysteine is sulfuric acid although other mineral acids such as hydrochloric acid may be used.

The following examples which are intended as informative and typical only and not in a limiting sense will further illustrate the process of my invention:

EXAMPLE I

*Removal of pure tyrosine from crude tyrosine-cystine mixture*

A mixture of crude tyrosine and cystine obtained from the hydrolysis of wheat gluten was treated in accordance with the principles of the present invention. The mixture contained about 76 per cent of tyrosine, 18 per cent of cystine and small amounts of other amino acids and other impurities. Two hundred grams of this mixture was slurred in 2.3 liters of water and the pH of the slurry adjusted to 10 by adding 1 liter of 0.5 molar sodium sulfide. The slurry was agitated for 45 minutes at room temperature. Thereafter, the pH of the slurry was adjusted to 7.6 with hydrochloric acid to precipitate the tyrosine and the slurry filtered to separate the precipitated tyrosine. The filter cake was dissolved in 6 normal hydrochloric acid and the solution was decolorized with a decolorizing carbon sold under the trade-mark of Norit 3N. After filtration to remove the carbon, the pH of the decolorized filtrate was adjusted to 3.0 to precipitate the tyrosine. The range may be 3.0 to 7.5. However, the lower pH is preferable since less inorganic salt is produced and the solubility of the tyrosine does not vary significantly in this range. The tyrosine was filtered off, washed, and dried. 157.2 grams of dried product was obtained, representing a recovery of 94.5 per cent of the tyrosine present in the original mixture. The tyrosine in a 2 per cent solution of 1 normal hydrochloric acid has an $(\alpha)_D^{25}$ of $-9.0°$ which agrees with that of pure tyrosine.

EXAMPLE II

*Recovery of cystine and tyrosine from a crude mixture of such amino acids*

Two hundred grams of the crude mixture of tyrosine and cystine, described in Example I, was slurried in 2.3 liters of water and the pH of the slurry was adjusted to 10 with 1 liter of 0.5 molar sodium sulfide. The slurry was agitated for one hour at room temperature, the pH then adjusted to 7.5 whereupon the tyrosine precipitated. The precipitated tyrosine was removed by filtration and the filter cake dissolved in a solution containing 211 g. concentrated hydrochloric acid and 1 liter of water. The resulting solution was decolorized by contacting it for 30 minutes with 5 g. of decolorizing carbon (sold under the trade-mark Norit 3N). The pH of the decolorized solution was adjusted to 3.0 to precipitate the tyrosine. The tyrosine was separated, washed with water and dried. One hundred and thirty-eight grams of dry tyrosine was recovered which represents 83 per cent of the original tyrosine. $(\alpha)_D^{25}$ in 1 N hydrochloric acid was $-9.6°$. The $(\alpha)_D^{25}$ of pure tyrosine under these conditions is about $-9.0°$.

Recovery of cystine from filtrate. The pH of the filtrate from the tyrosine separation was lowered to 4.0 with hydrochloric acid and then the filtrate was boiled for one hour. The pH was then lowered to 1.6 with sulfuric acid and the filtrate again boiled for one hour. Then the pH was raised to 3.8 with sodium hydroxide and the crude cystine which precipitated was filtrated off and dried. Thirty-eight grams of dry crude cystine was recovered. This was mixed with 200 ml. of concentrated hydrochloric acid and heated to boiling. Then 500 ml. of water and 1.5 g. of decolorizing carbon (Norit 3N) were added. The mixture was allowed to stand 30 minutes whereupon the temperature dropped to 50° C. The mixture was then filtered to remove the carbon. The pH of the filtrate was adjusted to 3.8 to precipitate cystine. The cystine was removed, washed with 800 ml. of water and dried. 22.9 Grams of purified cystine was obtained, representing 65 per cent of the original cystine. $(\alpha)_D^{25}$ in 1 N hydrochloric acid was $-214°$. The $(\alpha)_D^{25}$ of pure cystine is $-215°$.

EXAMPLE III

*Recovery of pure tyrosine from crude tyrosine-cystine mixture*

Six hundred grams of the crude mixture of tyrosine and cystine described in Example I was slurried in 6 liters of water and 4 liters of 0.5 molar sodium sulfide (crude grade), the pH of the resulting slurry being 10. The slurry was agitated one hour at room temperature and thereafter the pH of the slurry was lowered to 7.5 with hydrochloric acid. The tyrosine which precipitated was separated by filtration, the filter cake washed and reslurried in 5 liters of water. Then the pH of the slurry was raised to 11.5 with sodium hydroxide. Forty-eight grams of decolorizing carbon (Norit 3N) was added to the slurry, the slurry was allowed to stand for one hour and then filtered. The pH of the filtrate was adjusted to 3.5 with hydrochloric acid to precipitate the tyrosine. The tyrosine was separated, washed and dried. Four hundred and forty-three grams of purified tyrosine was recovered, representing 89 per cent of the original tyrosine. $(\alpha)_D^{25}$ in 1 N hydrochloric acid was —0.1°.

EXAMPLE IV

*Recovery of cystine and tyrosine from a crude mixture of such amino acids*

Four runs were carried out on a large scale. A slurry was prepared in each case by mixing 140 lbs. of the crude mixture of tyrosine and cystine, described in Example I, in 250 gals. of water. The pH of the slurry was adjusted to pH 10 with crude sodium sulfide. The slurry was mixed for one hour at room temperature, then hydrochloric acid was added to adjust the pH to 7.5. The tyrosine which precipitated was filtered off and the filtrate containing cysteine was held for recovery of cystine. The tyrosine cake was mixed with 125 gals. of water and dissolved by adjusting the pH of the slurry to 11.5 with sodium hydroxide solution. The solution was then decolorized at 25° C. by contacting it with 11 lbs. of decolorizing carbon (Norit 3N). After the carbon was removed by filtration the pH of the solution was adjusted to 4.5 with hydrochloric acid to precipitate tyrosine. The tyrosine recovered in four runs amounted to 242 lbs. and showed the following analysis:

| | Analysis | Theory |
|---|---|---|
| $(\alpha)_D^{25}$ in 1 N HCl ............ degrees | —9.5 | about —9. |
| Nitrogen ................................ percent | 7.5 | 7.7. |
| Ash ..................................... do | 0.18 | 0.0. |

The filtrates containing cysteine were combined and the pH was adjusted to 2.0 with sulfuric acid. The slurry was boiled for 5 hours and the oxidation was completed by passing air through the slurry for an additional 16 hours. The pH was then raised to 3.5 with sodium hydroxide to precipitate cystine and the cystine was removed by filtration. The cystine was then treated in 1000 g. batches for purification. Two thousand ml. of concentrated hydrochloric acid was added to each batch and, after mixing for one hour at room temperature to dissolve the cystine, 100 g. of decolorizing carbon (Darco KA) and 6000 g. of water were added and the suspension was again mixed for one hour. The slurry was filtered and the pH of the filtrate was raised to 5.2 with 8 normal sodium hydroxide solution. Yields of crystalline product per run were in the range of 742 to 777 g. Analyses of the combined batch of 16 lbs. of purified cystine were as follows:

| | Analysis | Theory |
|---|---|---|
| Nitrogen | 11.24 | 11.65 |
| Sulfur | 26.20 | 26.60 |
| Ash | 0.62 | 0 |

I claim:

1. The process of separating cystine and tyrosine which comprises treating an aqueous suspension containing cystine and tyrosine with a sulfide from the group consisting of sodium sulfide, potassium sulfide, and ammonium sulfide to reduce the cystine to cysteine and lowering the pH to a range where tyrosine is substantially insoluble and cysteine is soluble and separating the tyrosine.

2. The process of separating cystine and tyrosine which comprises treating an aqueous suspension containing cystine and tyrosine with a sulfide from the group consisting of sodium sulfide, potassium sulfide, and ammonium sulfide to reduce the cystine to cysteine, and lowering the pH to a range where tyrosine is substantially insoluble and cysteine is soluble, separating the tyrosine, oxidizing the cysteine in solution to cystine and separating the cystine in the pH range in which it is insoluble.

3. The process for treating a mixture containing tyrosine and cystine to recover tyrosine and cystine which comprises forming an aqueous suspension thereof, adding a sulfide from the group consisting of sodium sulfide, potassium sulfide and ammonium sulfide to adjust the pH of the suspension to 9 to 11 and to reduce cystine to cysteine, adjusting the pH to a point where tyrosine precipitates and removing the tyrosine, adding sufficient acid to the cysteine in solution to liberate hydrogen sulfide, removing the hydrogen sulfide and simultaneously oxidizing the cysteine to cystine and recovering the cystine in the pH range in which it is insoluble.

4. The process for treating mixtures containing tyrosine and cystine to recover tyrosine and cystine therefrom which comprises forming a suspension of such mixture in an aqueous solution of a sulfide from the group consisting of sodium sulfide, potassium sulfide and ammonium sulfide at a pH of 9 to 11, allowing the suspension to stand to reduce cystine to cysteine, adjusting the pH to about 7 to 9 to precipitate tyrosine, removing the tyrosine, adjusting the pH of the solution to 0.5 to 5.0, removing the hydrogen sulfide and thereby simultaneously converting the cysteine to cystine, and adjusting the pH of the solution to 2 to 6 to precipitate cystine and thereafter separating the cystine.

5. The process for treating mixtures containing tyrosine and cystine to recover tyrosine and cystine therefrom which comprises forming a suspension of such mixture in an aqueous solution of sodium sulfide at a pH of 9 to 11, allowing the suspension to stand to reduce cystine to cysteine, adjusting the pH to about 7 to 9 to precipitate tyrosine, removing the tyrosine, adjusting the pH of the solution to 0.5 to 5.0, removing the hydrogen sulfide and thereby simultaneously converting the cysteine to cystine, and adjusting the pH of the solution to 2 to 6 to precipitate cystine and thereafter separating the cystine.

6. The process for treating mixtures containing tyrosine and cystine to recover tyrosine and cystine therefrom which comprises forming a suspension of such mixture in an aqueous solution of potassium sulfide at a pH of 9 to 11, allowing the suspension to stand to reduce cystine to cysteine, adjusting the pH to about 7 to 9 to precipitate tyrosine, removing the tyrosine, adjusting the pH of the solution to 0.5 to 5.0, removing the hydrogen sulfide and thereby simultaneously converting the cysteine to cystine, and adjusting the pH of the solution to 2 to 6 to precipitate cystine and thereafter separating the cystine.

7. The process for treating mixtures containing tyrosine and cystine to recover tyrosine and cystine therefrom which comprises forming a suspension of such mixture in an aqueous solution of ammonium sulfide at a pH of 9 to 11, allowing the suspension to stand to reduce cystine to cysteine, adjusting the pH to about 7 to 9 to precipitate tyrosine, removing the tyrosine, adjusting the pH of the solution to 0.5 to 5.0, removing the hydrogen sulfide and thereby simultaneously converting the cysteine to cystine, and adjusting the pH of the solution to 2 to 6 to precipitate cystine and thereafter separating the cystine.

8. The process for treating mixtures containing tyrosine and cystine to recover tyrosine and cystine therefrom which comprises forming an aqueous suspension of such mixture, adding sodium sulfide thereto to adjust the pH to at least 10, allowing the suspension to stand at about 25° C. for 15 to 45 minutes to reduce the cystine to cysteine, adjusting the pH to 7.5 to precipitate tyrosine, removing the tyrosine, adjusting the pH of the solution to 1.6 to 2.0, removing the hydrogen sulfide and simultaneously oxidizing the remaining solution to convert the cysteine to cystine, and adjusting the pH to 3.5 to 6 to precipitate cystine and thereafter separating cystine.

9. The process for treating mixtures containing tyrosine and cystine to recover tyrosine and cystine therefrom which comprises forming an aqueous suspension of such mixture, adding sodium sulfide thereto to adjust the pH to at least 10, allowing the suspension to stand at about 25° C. for 15 to 45 minutes to reduce the cystine to cysteine, adjusting the pH to 7.5 to precipitate tyrosine, removing the tyrosine, adjusting the pH of the solution to 1.6 to 2.0, removing the hydrogen sulfide completely by boiling and simultaneously oxidizing the remaining solution to convert the cysteine to cystine, and adjusting the pH to 3.5 to 6 to precipitate cystine and thereafter separating cystine.

EARL V. CARDINAL.

References Cited in the file of this patent

UNITED STATES PATENTS

| Number | Name | Date |
|---|---|---|
| 2,414,303 | Holloway et al. | Jan. 14, 1947 |

OTHER REFERENCES

Anson et al., "Advances in Protein Chem." (Academic), vol. III, p. 333 (1947).

Greenbaum, Am. J. Pharm., vol. 107, pp. 162–73 (1935).

Przylecki et al., Chem. Abstracts, vol. 31, p. 3519 (1937).